United States Patent
By et al.

[11] Patent Number: 5,120,196
[45] Date of Patent: Jun. 9, 1992

[54] IMPELLER FOR A TORQUE CONVERTER

[75] Inventors: Robert R. By, New Baltimore; Theodore E. Hojna, Sterling Heights, both of Mich.

[73] Assignee: General Motors Corporation, Detroit, Mich.

[21] Appl. No.: 666,966

[22] Filed: Mar. 11, 1991

[51] Int. Cl.⁵ .............................. F01D 5/04
[52] U.S. Cl. ................. 416/180; 416/197 C
[58] Field of Search ............ 416/180, 197 C

[56] References Cited

U.S. PATENT DOCUMENTS

| | | | |
|---|---|---|---|
| 2,351,516 | 6/1944 | Jandasek | 416/132 R |
| 2,576,700 | 11/1951 | Schneider | 416/183 |
| 2,917,001 | 12/1959 | Zeidler et al. | 416/180 |
| 3,184,833 | 5/1965 | Zeidler et al. | 416/180 |
| 3,240,153 | 3/1966 | Schrader | 416/180 |
| 3,244,400 | 4/1966 | Saunders | 416/231 R |
| 3,426,535 | 2/1969 | Mlacker et al. | 416/180 |
| 4,671,061 | 6/1987 | Elderton | 416/180 |
| 5,037,272 | 8/1991 | By | 416/180 |

FOREIGN PATENT DOCUMENTS

| | | | |
|---|---|---|---|
| 1010164 | 6/1952 | France | 416/180 |
| 1066751 | 6/1954 | France | 416/180 |

Primary Examiner—John T. Kwon
Attorney, Agent, or Firm—Donald F. Scherer

[57] ABSTRACT

An impeller for a torque converter embodying the concepts of the present invention utilizes a substantially semi-toroidal shell. The shell has a radially inner periphery which defines an inlet portion and a radially outer periphery which defines an outlet portion. The shell is radially curved between the inlet portion and the outlet portion to define a concave annular recess. A plurality of full vanes and a plurality of splitter vanes are presented from the shell within the annular recess. The impeller vanes are disposed circumferentially about the concave recess at spaced intervals. Each vane has a leading head portion, an intermediate body portion and a trailing end portion. The leading head portions of both vanes are disposed in opposition to the inlet portion—the leading head portion of the full vanes being disposed in proximity to the inlet portion. The leading head portions of the splitter vanes are disposed in radially outwardly spaced relation to the inlet portion. The trailing end portions of both the full and the splitter vanes are disposed in proximity to the outlet portions. The leading head portions on both the full and the splitter vanes are bulbous with curvilinearly opposite surfaces converging along the intermediate body portions to terminate in the trailing end portions. The impeller vanes each have a radial dimension, but the radial dimension of the splitter vanes is substantially less than the radial dimension of the full vanes. The splitter vanes alternate with the full blades about the circumference of the shell housing. The full vanes extend fully between the inlet portion and the outlet portion.

4 Claims, 5 Drawing Sheets

IMPELLER FOR A TORQUE CONVERTER

TECHNICAL FIELD

The present invention relates to an improvement for a fluid coupling device. More particularly, the present invention relates to an improvement for fluid coupling devices in the nature of torque converters. Specifically, the present invention relates to an improved structural and hydrodynamic features for the pump or impeller element employed in vehicular torque converters.

BACKGROUND OF THE INVENTION

Fluid couplers in the nature of torque converters are widely employed in vehicles to transfer torque between the engine and the transmission. In addition to this fundamental purpose, torque converters serve two other primary functions. First, they provide a means by which to effect a smooth coupling between the engine and the transmission. Second, they provide hydraulic torque multiplication when additional performance is desired.

The typical torque converter utilized in a vehicular drivetrain normally has three major components —— viz.: a pump or input member (commonly designated as the impeller); the driven or output member (commonly designated as the turbine); and a reaction member (commonly designated as the stator).

Slots and tabs have been used, historically, to attach sheet metal impeller blades to the inner and outer housings. Including the cover as a component of the impeller assembly has simplified sealing the torque converter so that the impeller assembly may be contained within a housing that is filled with hydraulic fluid. The hydraulic fluid is circulated through the torque converter by rotation of the cover to which the impeller elements are affixed, and the circulating hydraulic fluid effects rotation of the turbine. The torque converter is thus a closed system with the impeller operatively connected to a source of input torque and with the turbine member operatively connected to deliver the output torque to the vehicular transmission.

Typically, the cover and the impeller elements that are attached thereto —— which combine to constitute the impeller assembly —— are affixed to a flex-plate that is bolted to the crankshaft of the engine. The turbine, on the other hand, is connected to an output shaft which exits the torque converter and becomes the input shaft of the vehicle transmission.

Because of the aforesaid mechanical connection between the engine and the impeller, the impeller will rotate at engine speed whenever the engine is operating. It is this rotation of the impeller which causes it to operate as a pump, and particularly a centrifugal pump. That is, the impeller ingests hydraulic fluid present at the central or hub portion thereof and discharges hydraulic fluid axially into the turbine at the radially outer rim of the impeller assembly. Whereas the impeller discharges the hydraulic fluid axially into the turbine, rotation of the impeller also imparts a circumferential or tangential component to the hydraulic fluid as it exits the impeller. As the hydraulic fluid exiting the impeller engages the turbine, the kinetic energy of the moving hydraulic fluid urges the turbine to rotate in response to rotation of the impeller.

When the vehicle is not moving, and even though the engine is idling, the impeller is not spinning sufficiently fast to supply the energy necessary to overcome the static inertia of the vehicle. In that situation, therefore, the hydraulic fluid simply flows through the turbine and the turbine does not rotate. This allows the vehicle to remain at rest, even though the transmission has been shifted into a selected drive range and the engine is running.

However, as the throttle is opened, the rotational speed of the engine, and therefore the impeller, increases. At some rotational speed of the engine, sufficient energy is being imparted to the turbine that it will be able to overcome the static inertia which prevents the vehicle from moving. At that time, the energy transferred from the impeller to the turbine will be delivered to the drive wheels through whichever of the drive ranges provided by the transmission has been selected.

Kinetic energy is most effectively imparted to the turbine when the hydraulic fluid circulating within the torque converter follows the contours of the turbine blades between the shell and core from which they are presented, and then leaves the turbine. However, the configuration of the turbine causes the fluid passing therethrough to exit in a direction that is generally inappropriate to that direction at which one would prefer to have the hydraulic fluid re-enter the impeller. Accordingly, were the fluid to re-enter the impeller in that direction, the fluid would strike the blades of the impeller in a direction that would be detrimental to the rotation of the impeller.

In order to minimize the problems resulting from the undesirable direction at which the fluid enters the impeller as it exits the turbine without any redirection, a stator is generally interposed within the path which the hydraulic fluid must traverse between its exit from the turbine and its re-entry into impeller. In fact, the stator redirects the hydraulic fluid which has exited the turbine so that the fluid will enter the input of the impeller in a direction that will cause the fluid to assist the engine in turning the impeller. The force which the hydraulic fluid thus imparts to the impeller comprises the source for the additional kinetic energy applied to the turbine. It is this additional energy applied to the impeller which results in an increase in the force applied to drive the turbine —— thereby accomplishing torque multiplication.

Historically, the blades presented by the impeller have, for the most part, been stamped from sheet metal and then secured to the shell and core of the impeller. However, it must be understood that sheet metal blades are extremely sensitive to the angle of incidence —— i.e.: the angular difference between the direction at which the hydraulic fluid actually flows into the impeller and the direction at which the fluid would most effectively engage the pump blades as they rotate. The angle of incidence is, therefore, at least partially a function of the disposition of the blades relative to the shell. In the typical torque converter heretofore described, the angle of flow incidence may vary through a range of approximately 75 degrees.

The incidence angle is equal to the difference between the inlet flow angle and the inlet blade angle. Incidence loss is due to the mismatch between the flow exit angle of one element and the inlet blade angle of the adjacent element. It occurs when the oil enters a blade row at some angle other than its physical inlet angle. The inlet flow angles changes with turbine/pump speed ratio. Since the physical blade angles are always at some fixed values, the torque converter elements operate under a wide range of incidence angle —— the difference between the inlet flow and the inlet blade angle. Therefore, incidence loss is an important parameter to be considered in the design of the torque converter.

In some speed ratio conditions, incidence loss can be the dominant loss. For example, the inlet flow angle to a stator blade row may vary from −60 degrees at stall to +50 degrees at the coupling point. But, the inlet blade angle is a constant value of zero degree. Incidence angle is thus 60 and −50 degrees at stall and the coupling point, respectively. For an impeller or pump, incidence angle can be as high as −40 and +35 degrees at stall and the coupling point, respectively. For a turbine, incidence angle can be as high as +25 and −20 degrees at stall and the coupling point, respectively. Incidence loss is the dominant loss at stall.

One structural arrangement heretofore employed to delay stall is to fashion the blades as vanes having a hydrofoil configuration. It is well known that the bulbous-nosed curvilinear vanes having a hydrofoil configuration delay separation of the fluid from the vane. It should be understood that the fluid need not maintain laminar flow along the entire radial extent of the surface on both sides of the vane. In fact, it is highly likely that there will be boundary layer turbulence along the back surface of the vanes —— i.e.: that surface which faces away from the direction in which the vanes are moving —— but the boundary layer will nevertheless adhere to the vane along a much greater radial extent because of the hydrofoil configuration incorporated in the impeller vanes.

A definite improvement in flow characteristics is achieved along a greater portion of the radial extent of the impeller vanes by employing a hydrofoil configuration. Simply adopting the bulbous-nosed hydrofoil configuration at the input end of the vane also introduces certain hydraulic restrictions. Primarily, the increased cross section of the vane at the inlet of the impeller reduces the effective flow area and impeller flow capacity. On balance, however, greater advantages inure to the user of a hydrofoil configuration for the impeller vanes in comparison to the user of sheet metal blades. Nevertheless, simply adopting vanes having a hydrofoil configuration in place of the flat or curved sheet metal impeller blades falls short of the desiderata.

SUMMARY OF THE INVENTION

It is, therefore, a primary object of the present invention to provide an improved impeller for a torque converter, wherein the impeller utilizes hydrofoil vanes in a unique manner which reduces the detrimental hydraulic forces attendant upon positioning the bulbous portion of all the hydrofoil vanes in typically close proximity to the inlet portion of the impeller.

It is a further object of the present invention to provide an improved impeller for a torque converter, as above, that does not appreciably reduce the minimum cross sectional area of the flow stream at the inlet to the impeller, even though the impeller vanes have a hydrofoil configuration.

It is another object of the present invention to provide an improved impeller for a torque converter, as above, that provides improved pressure and velocity characteristics along the flow stream.

It is still another object of the present invention to provide an improved impeller for a torque converter, as above, which accommodates a wider range of flow inlet angles —— i.e.: the angles of incidence —— without adversely affecting the operational efficiency of the impeller.

It is yet another object of the present invention to provide an improved impeller for a torque converter, as above, that utilizes alternatingly disposed full and splitter vanes to provide the desired operational characteristics to the impeller.

It is an even further object of the present invention to provide an improved and economical method for manufacturing a torque converter impeller.

These and other objects of the invention, as well as the advantages thereof over existing and prior art forms, which will be apparent in view of the following detailed specification, are accomplished by means hereinafter described and claimed.

In general, a rotatable impeller for a torque converter embodying the concepts of the present invention utilizes a substantially semi-toroidal shell housing having a radially inner and a radially outer periphery with a radially curved wall extending between the inner and outer peripheries to define a concave annular recess. The radially inner periphery substantially defines the inlet portion of the impeller, and the radially outer periphery substantially defines the discharge portion of the impeller.

A plurality of full vanes and a plurality of splitter vanes are presented within the annular recess of the shell and core housings. The impeller vanes are located at circumferentially spaced intervals within the concave recess. Each vane has a leading head portion, an intermediate body portion and a trailing end portion. The leading head portion is located at the radially innermost extent of each vane —— thereby being disposed in the closest proximity to the inlet portion of the impeller relative to the remainder of the vane. Conversely, the trailing end portion is located at the radially outermost extent of each vane and as such is disposed in proximity to the discharge portion thereof. The leading head portion is bulbous, with curvilinearly opposite surfaces converging along the intermediate body portion to terminate in the trailing end portion. The vanes are generally oriented radially within the recess although they are, in fact, somewhat canted or inclined so that the trailing end portion lags behind the leading head portion when the impeller is rotating.

The full vanes each have substantially the same radial dimension, but the radial dimension of the splitter vanes is substantially less than the radial dimension of the full vanes. The splitter vanes alternate with the full vanes about the circumference of the annular recess within the shell. Because the trailing end portion of the splitter vanes are also located in proximity to the discharge portion of the impeller, the leading head portion of each splitter vane is, therefore, spaced radially outwardly from the inlet portion of the impeller.

The present impeller vane arrangement is described in conjunction with one exemplary embodiment of a representative torque converter which is deemed sufficient to effect a full disclosure of the subject invention. The exemplary impeller vane arrangement is described in detail without attempting to show all of the various forms and modifications in which the invention might be embodied; the invention being measured by the appended claims and not by the details of the specification.

DESCRIPTION OF AN EXEMPLARY EMBODIMENT

One representative form of an improved impeller embodying the concepts of the present invention is designated generally by the numeral 10 on the accompanying drawings. The impeller 10 is depicted as being incorporated in a torque converter unit 12.

Figure 1:
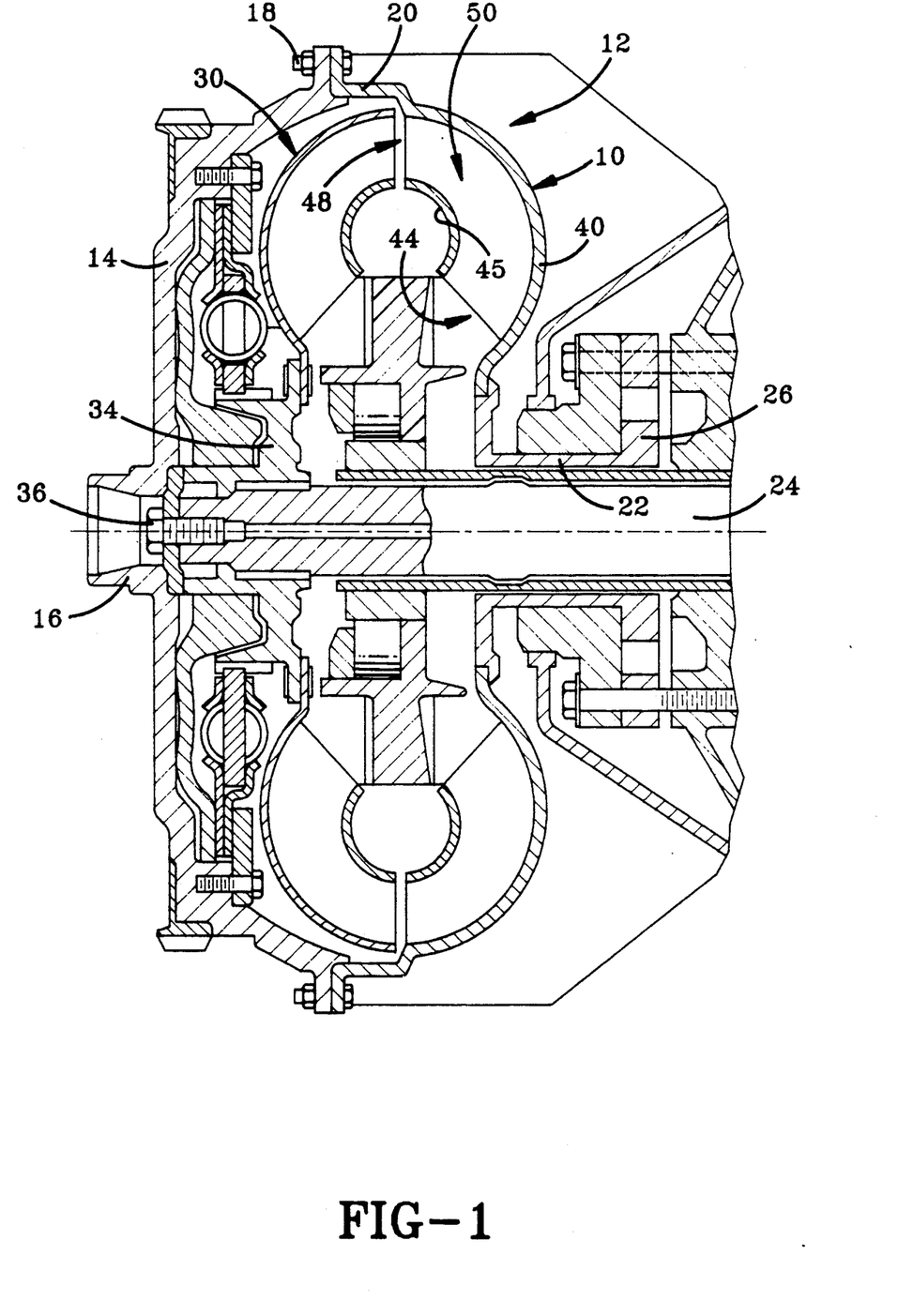
FIG. 1 is a generally schematic, longitudinal section through a torque converter of the type that may be operatively interposed between the engine and the transmission of a vehicle, the torque converter depicted being readily adapted to employ an impeller embodying the concepts of the present invention.

Conventionally, a torque converter unit 12 employs a flex-plate 14 which may present a coupling 16 by which to effect a drive connection with a crankshaft (not shown) presented from a source of rotational power such as that provided by a vehicle engine. The flex-plate 14 is also operably connected, as by bolts 18, to the radially outer perimeter of an impeller cover 20 in the torque converter unit 12. The cover 20 is, in turn, conventionally secured, as by welding, to a drive hub 22 which circumscribes the output shaft 24 for rotation therewith, and with respect thereto. The drive hub 22 conventionally operates a transmission pump 26, and/or a power take-off unit (not shown) that is housed within, or in close proximity to, the torque converter unit 12. It will be appreciated from the foregoing description that rotation of the flex-plate 14 in the torque converter unit 12 will result in the direct rotation of the cover 20. As will be apparent from the description herein, the cover 20 constitutes an element of the impeller 10.

The torque converter unit 12 is further characterized by the customary stator 28, turbine 30, and a combined pressure plate and damper assembly 32. The turbine 30 is mechanically affixed to a turbine hub 34 which is concentrically disposed about the output shaft 24 and which rotates with the turbine 30. The turbine hub 34 is drivingly connected to the output shaft 24 by any of a number of conventional means, such as splines. The turbine hub 34 is secured in its axial position along the output shaft 24, and maintained in driving connection therewith, by virtue of a fastening means in the nature of a bolt 36 which is adapted to be secured within an axially oriented threaded bore (not shown) in the end of the output shaft 24. As such, the fastening bolt 36 secures the torque converter unit 12 onto the output shaft 24 and thereby effects the driving interconnection between the torque converter unit 12 and the output shaft 24 as well as the transmission pump 26 and/or the power take-off (not shown).

Figure 2:
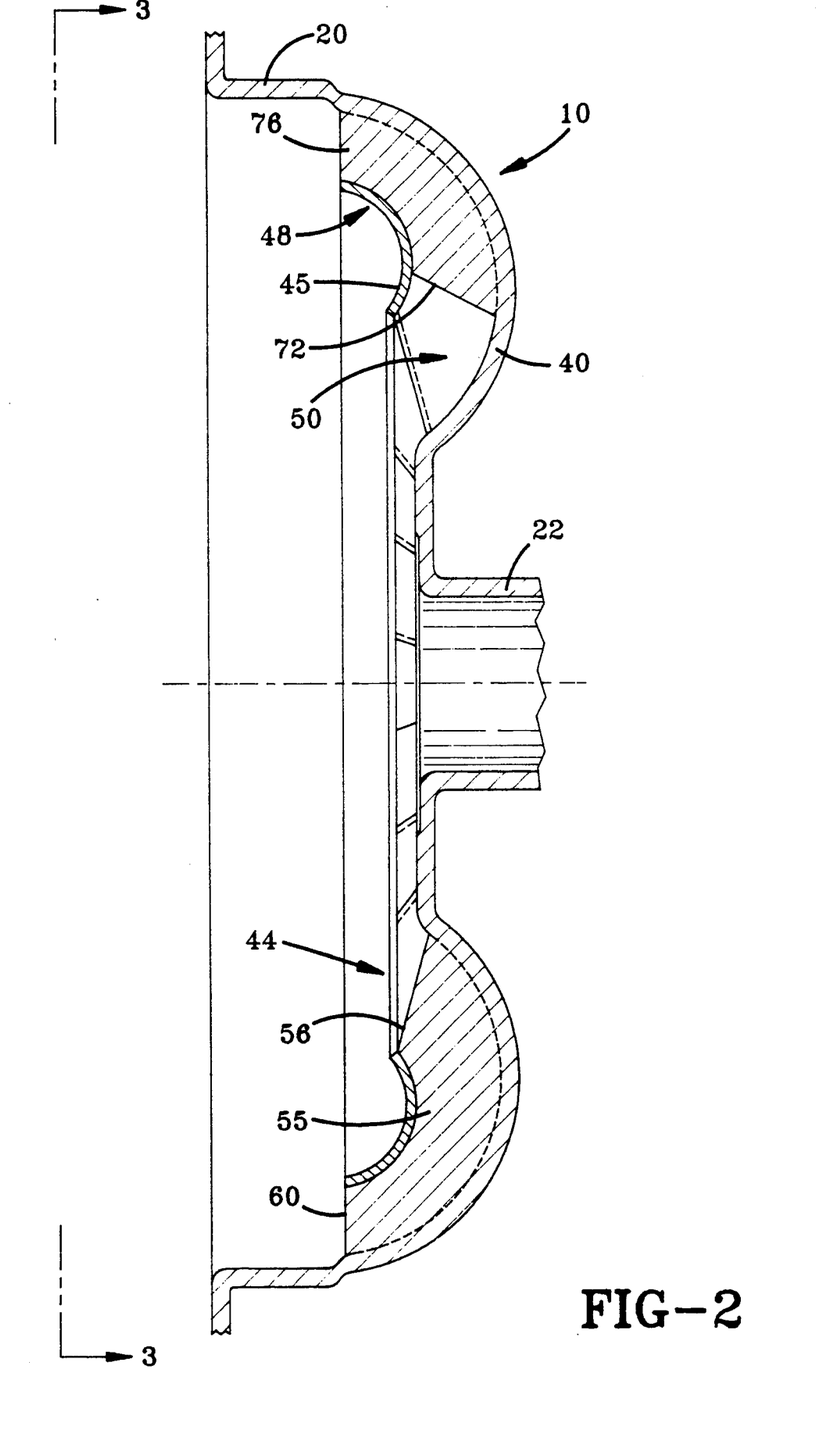
FIG. 2 is an enlarged area of FIG. 1 which depicts an impeller embodying the concepts of the present invention in cross section.

The cover 20 includes a semi-toroidal shell portion 40 and a core portion 45 that constitute the housing for the impeller 10. The radially inner periphery of the shell 40 and core 45 define the inlet portion 44 of the impeller 10, and the radially outer periphery of the shell 40 and core 45 define the outlet or discharge portion 48 of the impeller 10. The shell 40 and the core 45 are radially curved, and extends between the inlet and outlet portions 44 and 48, respectively, to present a concave annular recess 50.

Figure 3:
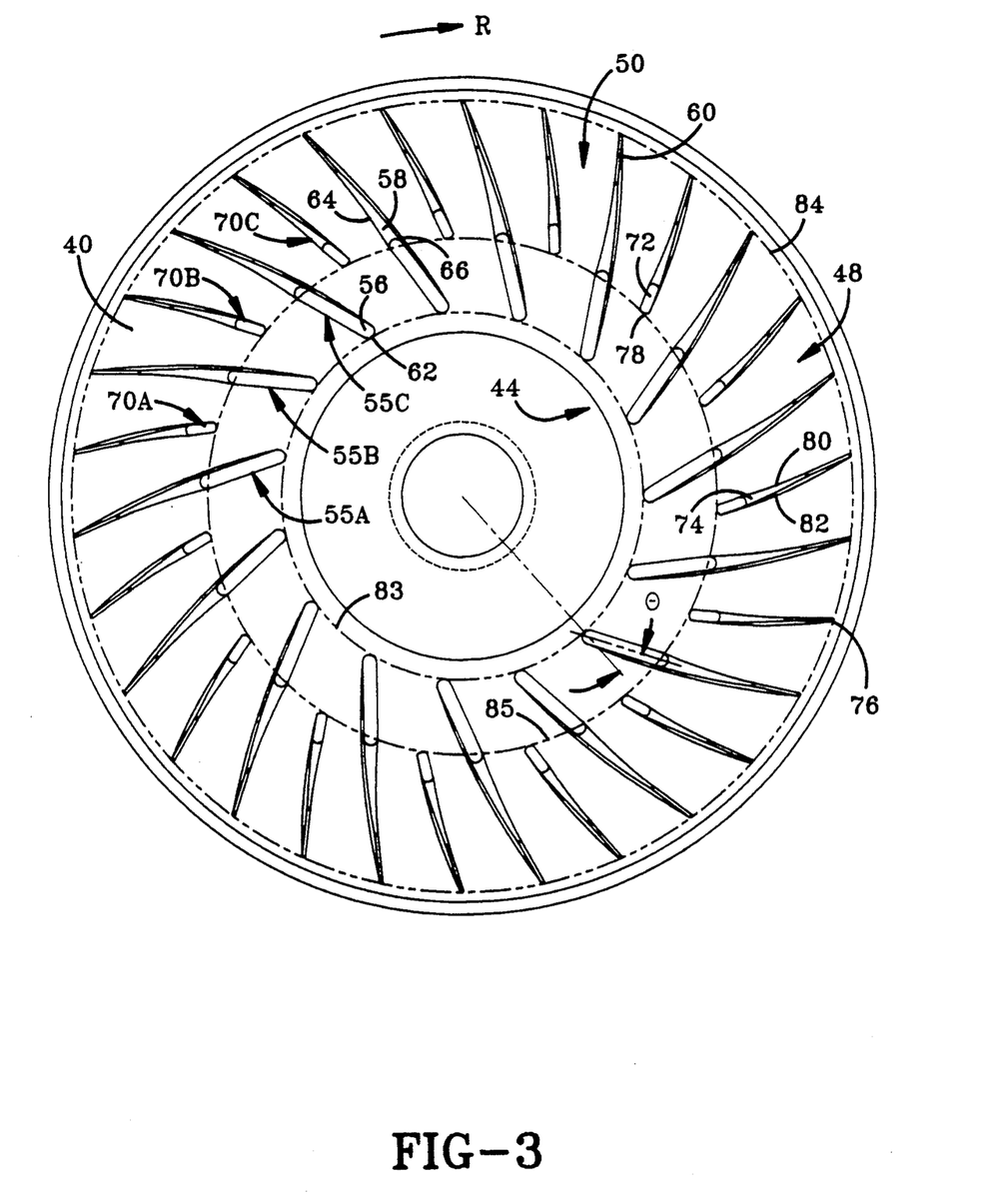
FIG. 3 is a frontal elevation, taken substantially along line 3——3 of FIG. 2 depicting the circumferential disposition of the full and splitter vanes within the impeller with the core removed.
Figure 4:
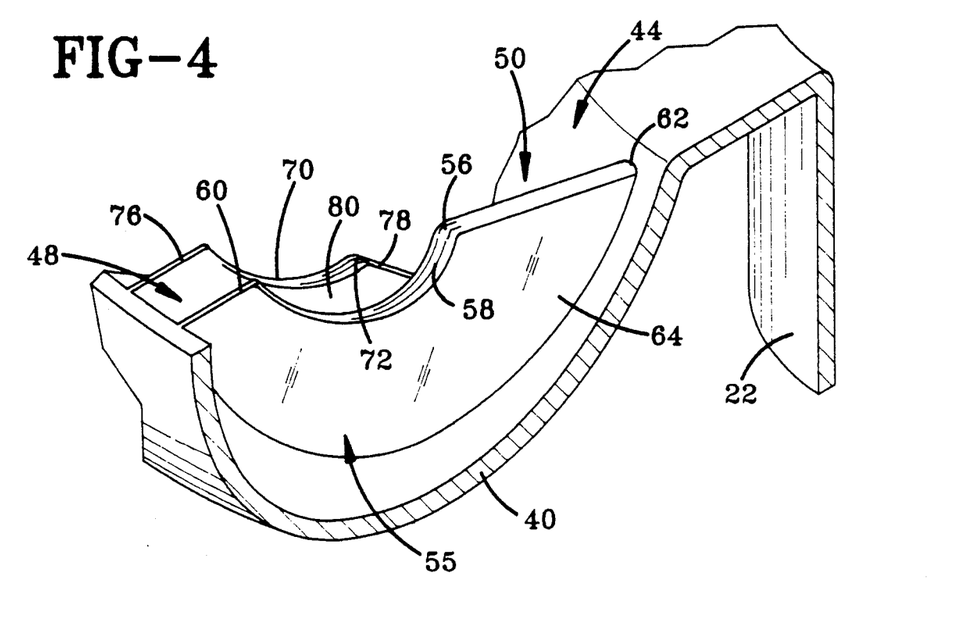
FIG. 4 is an enlarged perspective view of the full hydrofoil vane that may be integrally presented from the shell of the impeller housing and also depicting a splitter vane in the background with the core removed.

With reference to FIGS. 2 and 3, a plurality of full and splitter vanes 55 and 70, respectively, extend axially between the shell 40 and the core 45 to lie inwardly of the concave annular recess 50. The full vanes 55 are disposed at circumferentially spaced intervals about the recess 50, and each full vane 55 has a leading head portion 56, an intermediate body portion 58 and a trailing end portion 60. The leading head portion 56 presents a bulbous nose 62 which merges with curvilinearly opposite surfaces 64 and 66 that converge along the intermediate body portion 58 and terminate at the trailing end portion 60.

The successive full vanes 55A, 55B, etc. each have substantially the same radial dimension and substantially the same cross-sectional configuration.

As previewed in the previous paragraph, and as will be noted in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are a plurality of full vanes which are generally identified by the numeral 55, but the specific, individual full vanes are, therefore, identified as 55A, 55B, 55C, etc. in the specification and on the drawings. This same suffix convention shall be employed throughout the specification.

The leading head portion 56 of each full vane 55 is juxtaposed with respect to the inlet portion 44 of the impeller 10. As shown in FIG. 3, the leading head portion 56 of each vane 55 is disposed along a first reference circle 83 which is located about, and in relatively close proximity to, the inlet portion 44 of the impeller 10. Conversely, the trailing end portion 60 of each full vane 55 is disposed along a second reference circle 84 which is located in relatively close proximity to the outlet portion 48 of the impeller 10.

The splitter vanes 70, which alternate with the full vanes 55, also have a leading head portion 72, and intermediate body portion 74 and a trailing end portion 76. The leading head portion 72 also presents a bulbous nose 78 which merges with curvilinearly opposite surfaces 80 and 82 that converge along the intermediate body portion 74 to terminate at the trailing end portion 76.

The successive splitter vanes 70A, 70B, 70C, etc. each have substantially the same dimensions and substantially the same cross-sectional configuration. However, the length of each splitter vane 70 falls within the range of from about fifty-five percent (55%) to about seventy percent (70%) of the length of a representative full vane 55. Hence, when the trailing end portion 76 of the several splitter vanes 70 are disposed along the second reference circle 85 which is juxtaposed with respect to the outlet portion 48 of the impeller 10, the leading head portion 72 of each splitter vane 70 is disposed in radially outwardly spaced relation with respect to the inlet portion 44 of the impeller 10 to lie along a third reference circle 85. The third reference circle 85 is located radially outwardly of the inlet portion 44 at about thirty percent (30%) to about forty-five percent (45%) of the radial distance toward the outlet portion 48, as is also best seen from FIGS. 2 and 3. As such, the third circle 85 extends medially through the intermediate body portion 58 of the full vanes 55.

In a typical torque converter wherein the internal diameter of the annular recess 50 measures approximately 20 mm and the outer diameter of the annular recess 50 measures approximately 49 mm, the full vanes 55 will have a transverse dimension —— i.e.: a thickness —— of approximately 4.5 mm at the leading head portion 56 and a transverse dimension of approximately 1.25 mm at the trailing end portion 60. Similarly, the splitter vanes 70 will have a transverse dimension of approximately 2.25 mm at the leading head portion 72 and a transverse dimension of approximately 1.25 mm at the trailing end portion 76. Although the vanes 55 and 70 have a hydrofoil configuration and are not, therefore, planar, the transverse dimension of each vane is, nevertheless, relatively thin in comparison to their radial and axial dimensions.

Within an annular recess 50 having such dimensions, one can advantageously employ fifteen of the full vanes 55 having the dimension recited, and the full vanes 55 may be circumferentially spaced at approximately twenty-four degree intervals. An impeller 10 embodying the concepts of the present invention could also employ fifteen splitter vanes 70 that would preferably alternate with the full vanes 55 so that each alternatively successive full vane 55 and splitter vane 70 would be circumferentially spaced at approximately twelve degrees.

Although the description of the vanes has heretofore suggested that each is radially disposed, it should be understood that the vanes 55 and 70 are not truly radial. In fact, it is preferable that each vane 55 and 70 be disposed at an angle theta with respect to a radial reference plane, as represented at 86. To complete the exemplary impeller 10 heretofore described, the angle theta would be approximately eighteen degrees. The vanes 55 and 70 are thus disposed with the leading head portions 56 and 72 offset in that direction in which the impeller is operatively rotated, that direction being identified by the arrow "R" in FIG. 3. As such, the respective trailing end portion 60 and 76 of each vane 55 and 70 lags behind or "tails off" relative to the direction "R" in which the impeller 10 is rotating, and at an angle theta.

OPERATION

As should now be apparent, the present invention primarily relates to an improved impeller 10 for a torque converter 12, and particularly the configuration and disposition of the vanes 55 and 70 employed by the impeller 10. Because of the improved configuration and disposition of both the full and the splitter vanes 55 and 70, respectively, the impeller 10 more efficiently receives the hydraulic fluid as it enters the inlet portion 44 of the impeller 10. It should be understood that the fluid does not enter the impeller 10 at a constant angle of incidence due to the constantly changing angular velocity of the impeller 10 as well as the varying velocity of the hydraulic fluid which re-enters the impeller 10 after leaving the turbine 30. Impellers embodying the concepts of the present invention reduce the shock and turbulence losses across a wide range of the angles of incidence encountered within a torque converter, while providing a relatively inexpensive and an extremely reliable pump.

Figure 6:
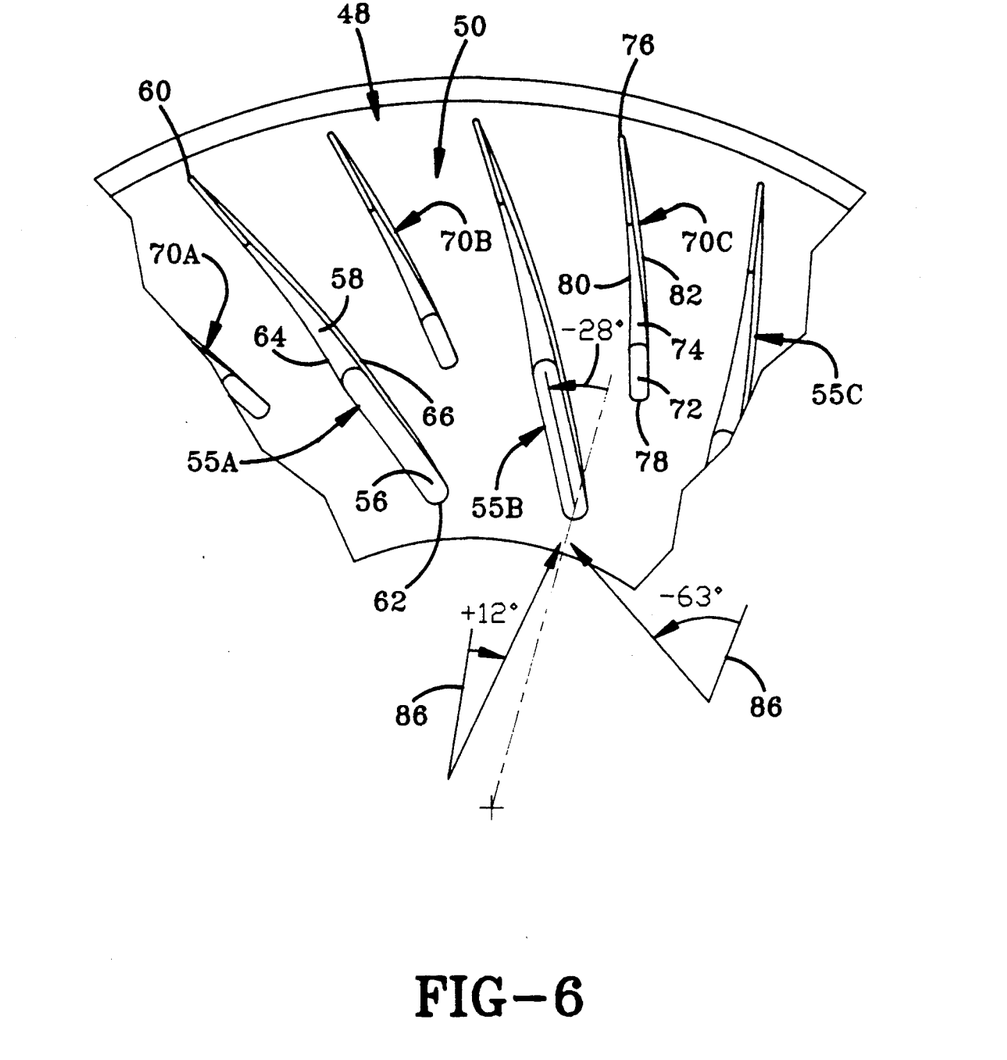
FIG. 6 is an enlarged area of FIG. 3 depicting the range of the angles of incidence through which the hydraulic fluid can normally be expected to engage the full vanes in the impeller shown and described herein.

Fully to appreciate the improvement achieved by the present invention, it is necessary to understand the operation of the impeller 10 within the environment of a vehicular torque converter 12. Specifically, as the speed of the turbine 30 increases, it builds up a centrifugal head that is counter to the head of the impeller 10 The head of the fluid exiting the turbine 30 will be reversed by the stator 28 as the fluid is directed by the stator 28 to the inlet 44 of the impeller 10. At stall and low speeds, the force on the stator 28 will be the greatest, because directional flow of the fluid will have to be altered to the greatest degree. As the turbine begins to rotate, the fluid entering the inlet 44 of the impeller 10 will strike the vanes 55 of the impeller 10 at the most inefficient angle of incidence. Typically, that inefficient angle of incidence will be approximately −40 degrees on one side of a reference plane 86, as depicted in FIG. 6.

Figure 5:
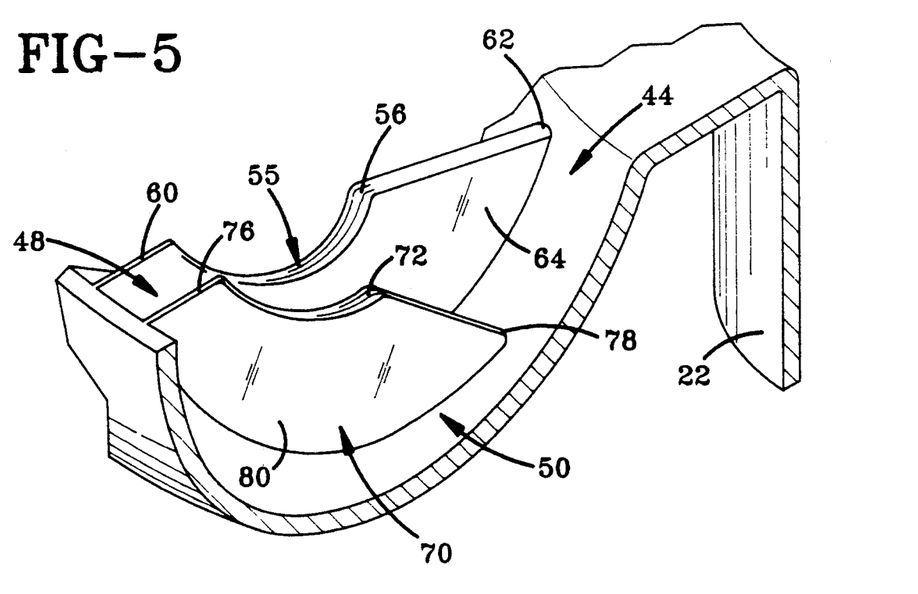
FIG. 5 is an enlarged perspective view of a splitter vane that may be integrally presented from the impeller housing and also depicting a full hydrofoil vane in the background with the core removed.

As the rotational speed of the turbine increases, the flow eventually strikes the impeller at an increasingly more favorable angle of incidence. When that angle becomes approximately −63 degrees on the opposite side of reference plane 86 (also as depicted in FIG. 5), the torque converter begins to operate as a fluid coupler. This angle of incidence is identified as being positive inasmuch as it is in the direction of rotation.

As a fluid coupler, the direction and velocity of the fluid entering the turbine is such that kinetic energy is neither extracted from the fluid nor added thereto. This coupling operation, which occurs when the torque converter is operating at overrunning speed, absorbs driveline and road shock. In essence, the torque converter has become a flexible connection to dampen vibrations in the system.

The greatest difficulty in designing a torque converter is to attain a high efficiency over a wide range of speeds and loads. As the speed of the impeller and/or the turbine changes, so does the angle of incidence at which the fluid strikes the impeller vanes on re-entry into the impeller. Because the torque converter has no constant angular velocity or no constant load to use as the design parameter, torque converters are designed to operate most efficiently at an angular velocity selected by the designer. As the angular velocity increases or decreases from the design velocity, the efficiency of the torque converter decreases.

The present invention expands on the range of the angular velocities within which the torque converter can be efficiently operated. Incorporating the present invention in a torque converter is deemed to increase the efficiency. When losses are reduced, both efficiency and torque ratio are improved. The improved hydrofoil design gives 2% and 10% improvements in converter efficiency and stall torque ratio, respectively. These improvements translate to about +0.5 mpg in fuel economy and −0.5 seconds in vehicle performance (time from 0 to 60 mph).

There are several reasons for the improved efficiency. First, by drastically reducing the number of vanes which terminate in proximity to the inlet portion 44 of the impeller 10, the inlet flow area is vastly improved. That is, the inlet flow area is delineated by the area between the leading head portions 56 of only the full vanes 55 inasmuch as the leading head portions 72 of the splitter vanes 70 are radially removed from the inlet portion 44 of the impeller 10. And yet, both the full vanes 55 and the splitter vanes 70 have their trailing end portions 60 and 76 located in contiguous juxtaposition to the outlet portion 48 of the impeller 10. Thus, the vane surfaces 66 and 82 (on the respective vanes 55 and 70) which impart the final thrust to the hydraulic fluid exiting the impeller 10 are not reduced, even through the inlet flow area is increased.

It is recognized that the capacity of a torque converter to transfer energy is significantly determined by the flow capacity of the impeller 10. The prior art attempts to maximize the flow capacity by using thin sheet metal blades inasmuch as that permits the maximum inlet flow area for the number of blades. Using vanes having a hydrofoil configuration on at least the leading head portions would, therefore, if simply substituted for the sheet metal blades, reduce the inlet flow area. An impeller 10 embodying the concepts of the present invention, however, incorporates the most favorable attributes available by adopting the favored angle of incidence of the hydrofoil leading head portion and at the same time increasing the inlet flow area, without reducing the blade surface at the outlet portion.

Historically, the major production method for making impellers has been to use sheet metal blades affixed to stamped core and shell housings. By this method, each blade needs to be individually attached to the housing and the production costs are, therefore, quite expensive. Moreover, the connections between the blades and the housings add obstacles which impart turbulence and leak to the flow pattern. Today, a low cost investment casting process allows articles to be cast in aluminum or iron relatively inexpensively. Cast vanes, in lieu of the blades, as an integral part of the impeller eliminates the costly expense of attaching each vane to the shell and core.

In addition, the process will create a stronger pumping mechanism. Using the stamped sheet metal blades created a problem in operation in that a ceiling was placed on the pressure and the rotation that could be applied to the pump. Above about 500 kPa and 7000 rpm, the connection used to fasten the vanes to the housing begin to break. However, as is known, higher pressures will tend to reduce the detrimental effects of air bubbles entrained within the hydraulic fluid. As the liquid pressure drops below vapor pressure, the fluid will cavitate —— an undesirable result. Casting the shell with integrally formed vanes allows the pump to be subjected to far greater pressures, thereby reducing the chance that cavitation will occur. The improved pressure distribution resulting from the hydrofoil profile will also reduce the effects of cavitation.

As should now be apparent, the present invention not only teaches that an impeller for a torque converter embodying the concepts of the present invention provides an increased range of angular incidence through which the hydraulic fluid can reenter the impeller with a marked maintenance of efficiency but also otherwise accomplishes the objects of the invention.

The embodiments of the invention in which an exclusive property or privilege is claimed are defined as follows:

1. A rotatable impeller for a torque converter, said impeller comprising: a substantially semi-toroidal shell having a radially inner and a radially outer periphery with a radially curved wall extending between said inner and outer peripheries to define a concave annular recess; said radially inner periphery defining the inlet portion of the impeller; said radially outer periphery defining the discharge portion of the impeller; a semitoroidal core having a convex outer surface spaced from the concave annular recess and cooperating with said shell to define an inner limit of the inlet and outlet portions of the impeller; fifteen full vanes and fifteen splitter vanes presented from said shell within said annular recess and oriented to extend generally radially between said shell and said core; said vanes disposed about said concave recess at circumferentially spaced intervals; each vane having a leading head portion, an intermediate body portion and a trailing end portion; said leading head portions of said full vanes being disposed along a first circumferential reference circle disposed concentrically outwardly of, and in relatively close proximity to, the radially inner periphery of said shell so as to be substantially in opposition to said inlet portion; said trailing end portions each being disposed along a second circumferential reference circle that is disposed concentrically outwardly of said first reference circle so as to be substantially in opposition to, and adjacent, said outlet portion; said leading head portion being bulbous with curvilinearly opposite surfaces converging along said intermediate body portion and terminating in said tailing end portion; said vanes each having a radial dimension; the radial dimension of said splitter vanes being substantially less than the radial dimension of said full vanes; said splitter vanes alternating with said full vanes about the circumference of said shell housing; the leading head portion of said splitter vanes being disposed along a third circumferential reference circle disposed concentrically outwardly of said first reference circle and said trailing end portions each being disposed along said third reference circle located adjacent to said outlet portion; said third reference circle extending medially through the intermediate body portion of said full vanes wherein said vanes tail off at approximately 18 degrees; wherein the radial dimension of said splitter vanes fall within a range of from about fifty-five percent to about seventy percent of the radial dimension of said full vanes.

2. An impeller for a torque converter, as set forth in claim 1, wherein: said trailing end portions of said vanes are disposed at 12 degree intervals along said second reference circle.

3. An impeller for a torque converter, as set forth in claim 1, wherein: the leading head portion of said full vanes has a transverse dimension of approximately 4.5 mm which converges through said intermediate body portion to a transverse dimension of approximately 1.25 mm at said trailing end portion.

4. An impeller for a torque converter, as set forth in claim 3, wherein: the leading head portion of said splitter vanes has a transverse dimension of approximately 2.25 mm which converges through said intermediate body portion to a transverse dimension of approximately 1.25 mm at said trailing end portion.

* * * * *